UNITED STATES PATENT OFFICE.

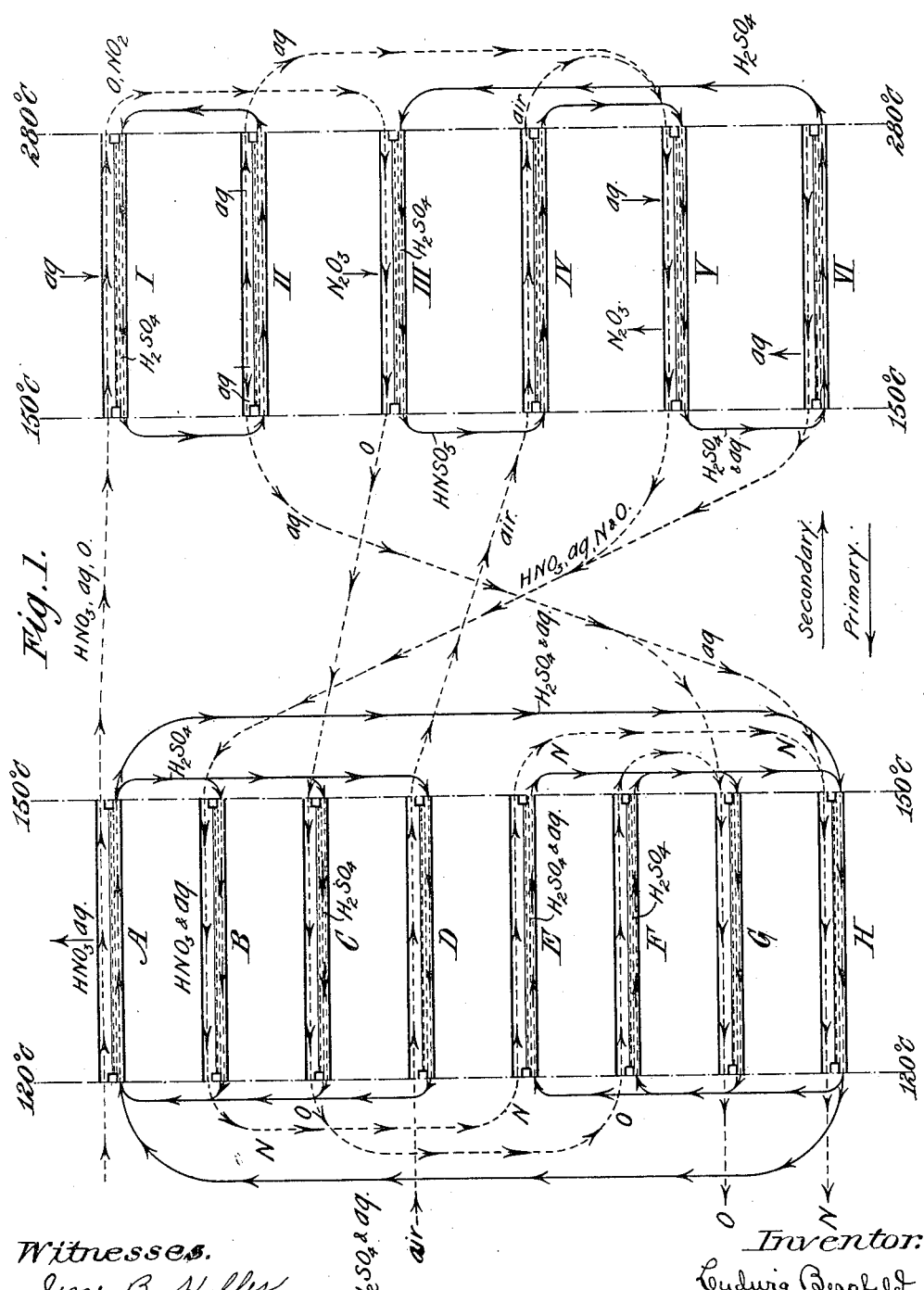

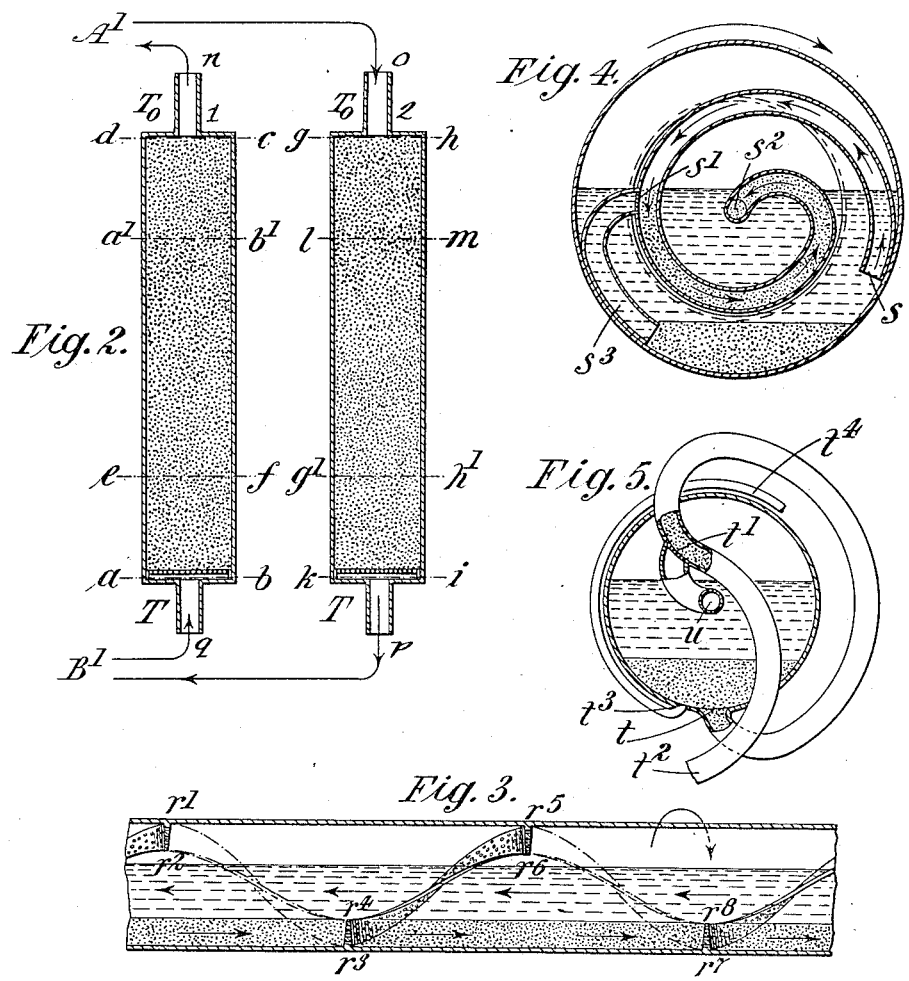

LUDWIG BERGFELD, OF DURLACH, NEAR KARLSRUHE, GERMANY.

SEPARATION OF OXYGEN FROM THE AIR.

1,120,436.  Specification of Letters Patent.  Patented Dec. 8, 1914.

Application filed September 30, 1913. Serial No. 792,622.

*To all whom it may concern:*

Be it known that I, LUDWIG BERGFELD, a subject of the German Emperor, residing in Durlach, near Karlsruhe, in Germany, have invented certain new and useful Improvements in the Separation of Oxygen from the Air, of which the following is a specification.

This invention is for improvements in or relating to the separation of oxygen from the air.

According to this invention the process for obtaining oxygen from the air by a continuous cycle of operations consists in producing a high oxid of nitrogen by the action of air on a lower oxid and then decomposing the higher oxid produced into oxygen and the lower oxid, the process being repeated any number of times.

A feature of the present invention consists in the employment of sulfuric acid as an intermediate agent to effect the decomposition of the high oxid of nitrogen, whereby there are obtained as products of the reaction nitrosulfonic acid, oxygen and water, from the former of which, namely the nitrosulfonic acid, sulfuric acid and the low oxid of nitrogen are regenerated by the action of water.

In such a process a further feature of this invention consists in utilizing the heat of the hot fluid for heating the cool fluid and at the same time cooling the hot fluid, as for example by passing the two fluids in opposite directions through two adjacent chambers separated by a thin wall of conducting material.

Throughout this specification the term "fluid" is used to mean either liquids or gases or both liquids and gases.

In carrying out the invention, in order to effect an interchange of heat between gases or between gases and liquids when the said fluids do not come into direct contact with one another, there can be employed an intermediate liquid. Further, in addition to the interchange of heat that may take place between two substances on account of their difference in temperature, it is also possible according to this process to transfer latent heat from one substance to another, for example, the heat which is liberated from a vapor in condensing to a liquid at the same temperature may be transferred to a cooler substance in exactly the same manner as heat is transferred from the body at a higher temperature to the said cooler substance. In this connection it will be easily seen that it is possible similarly to effect an interchange of energy between two sets of substances, for example the heat that may be evolved from one set of substances owing to the occurrence therein of an exothermic reaction can be transferred to a second set of substances, where it may be again transformed into chemical energy during the course of a reaction that takes place in the said second set of substances. There can also be employed in this process a separate auxiliary transmitter of heat for effecting the heat interchange between the two substances treated, namely the one to be cooled and the one to be heated, the said auxiliary transmitter being for example in the shape of small solid particles composed of a suitable substance such as quartz.

The basis of this invention is the well-known fact that, on being heated to above its boiling point, nitric acid decomposes and gives off the oxygen according to the following equation:—

$$2HNO_3 = 2NO_2 + H_2O + O.$$

Below 250° C. this decomposition is only partial, but proceeds to completion if the equilibrium is disturbed by the withdrawal of water and nitric acid. Sulfuric acid is adapted for this purpose, as on the one hand it combines with water and on the other hand forms nitrosyl sulfuric acid from the nitrogen peroxid, with further separation of oxygen according to the following equation:—

From the nitrosyl sulfuric acid, sulfuric acid and nitrous anhydrid are regenerated by the action of water, thus:—

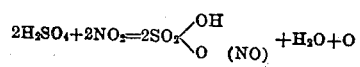

The nitrous anhydrid reacts with air and water to reform nitric acid according to the equation:—

$$N_2O_3 + O_2 + H_2O = 2HNO_3.$$

It will be seen therefore that the original starting materials of the process are thus reformed quantitatively.

Preferably in carrying the process into effect the reactions are carried out in accordance with the principle of "interchange of heat," a strict continuity of the cycle during the whole process being observed. According to this principle a substance to be heated, which will be designated the secondary stream element of the heat exchanging device, receives heat from a substance which is to be cooled, this latter being designated the primary stream element; this exchange of heat is brought about by causing the said materials to pass over one another in counter current, the materials being separated from each other by a sufficiently long and thin partition which is a good conductor of heat. In the present case the condition of equivalence is present, as the air supplied is equal to that carried away, even including the content of water, since the gases pass through water both at the beginning and at the end of the process. Besides the free heat, the latent heat of the vapors and the chemical energies of the reacting substances also enter into consideration with regard to the exchange of heat, as the necessary and sufficient condition for this can be fulfilled, namely that chemical decomposition and combination as well as evaporation and liquefaction can be carried out as reversible processes with functional dependence on the temperature. To this end, the water vapor or steam is generated from dilute sulfuric acid, the boiling point of which rises as is well-known with the concentration, and the liquefaction of the steam is effected by means of sulfuric acid, in so far as it is not a question of condensation or vaporization below the boiling point. Nitric acid can also be evaporated and condensed in the same manner. For example, if a mixture of equal parts of water, sulfuric acid and nitric acid be heated, the evaporation of the latter in the interval from about 123° C. to nearly 160° C. approximately keeps pace, as the temperature increases, with the evaporation of the water. The exchange of heat between two gases, or between a gas and liquid not in direct contact with the latter, is preferably effected by making use of liquids as intermediaries; the liquid is brought into thorough contact with the gas by means of a suitable stirring device.

The process can be carried out in the following manner:—Nitric acid vapors heated to the desired temperature in an apparatus designed to give effect to the principle of exchange of heat, are caused to pass over fairly concentrated, nearly boiling, sulfuric acid of the same temperature, both flowing as primary currents, until the sulfuric acid is saturated at about 145° C. with water and oxids of nitrogen while oxygen remains over the liquid and is carried away. The nitrosyl sulfuric acid then passes into the secondary current of the heat exchange apparatus and there discharges nitrous acid and water, the latter two being preferably discharged at several places, combined and mixed with air.

The mixture of oxids of nitrogen, air and water, acts as the primary current as regards exchange of heat to the secondary current of the air supplied for the process and the vapors of nitric acid and any liquid nitric acid developed therefrom; the nitric acid resulting from the combination of the mixture of oxids of nitrogen, air and water, is then conveyed to the stream of sulfuric acid flowing as a primary current. This stream of sulfuric and nitric acids, cooled to the greatest possible extent, at the end of its course as a primary current, again enters the secondary current and here supplies the nitric acid vapors for the formation of nitrosyl sulfuric acid, as already described. The cycle is thus closed.

It must be borne in mind that all the reacting substances taking part in this process are heated or cooled merely by exchange of heat, and the process must be carried out in such manner that the given stages of the primary current correspond exactly to those of the secondary current. In order to remove the last traces of nitric acid, the discharged gases can be submitted to a separate cooling arrangement in accordance with the heat exchange principle or they can be washed with water or a solution of ammonium nitrate etc.

It is immaterial for the process which of any other possible methods are selected. For example nitric acid may be volatilized by steam (the steam being generated from dilute sulfuric acid or acid nitrates) in an apparatus working according to the heat exchange principle and the nitric acid vapors may be deprived of water before the formation of nitrosyl sulfuric acid by means of a primary current of sulfuric acid or phosphoric acid, or a corresponding excess of sulfuric acid could be employed during the formation of the nitrosyl sulfuric acid.

A practical method of carrying this invention into effect will now be described with the aid of the accompanying diagrammatic sketches, of which—

Figure 1 illustrates the arrangement of the conduits conveying the reacting substances and the products of reaction and the direction of the flow of the currents through the same, and Figs. 2 to 6 details in the construction of the said conduits.

Referring now to Fig. 1, full lines indicate pipes conveying currents of liquid, dotted lines gas and steam pipes, the direction of the currents being indicated by arrows. The pipes Nos. I to VI of the construction hereinafter described, are secured to one and the same rotatable spindle, the extreme range of temperature at which the pipes are maintained grading from about 150° C. at one end to 280° C. at the other end.

In pipe I, the current of sulfuric acid flowing in the primary direction withdraws water from a current of nitric acid vapors and steam flowing in the secondary direction. Nitrogen peroxid $NO_2$, and oxygen escape, and are conducted as a primary current into pipe III, where they meet a current of sulfuric acid also flowing in the primary direction; here the sulfuric acid absorbs the $NO_2$, while the oxygen liberated escapes. The liquid from pipe I enters pipe II as a secondary current, and here discharges its water in the form of vapor, for the most part in the direction of the secondary current and as regards a small portion in the primary direction. The residual liquid is returned to pipe I. From pipe III, nitrosyl sulfate passes in the secondary direction into pipe IV, where it meets with air also flowing in the same direction. After passing through this pipe, the nitrosyl sulfate and air, together with the steam given off in a secondary direction from pipe II, are conducted in the primary direction into pipe V, where nitrous anhydrid $N_2O_3$ is expelled from the nitrosyl sulfate, the water is deposited. The aqueous sulfuric acid which is here formed is then passed in the secondary direction through pipe VI, where it gives off its water in the primary direction and flows back as a concentrated acid to pipe III. The vapors from pipes V and VI are combined, and escape as nitric acid, water and nitrogen, together with an excess of oxygen, which latter can be easily removed subsequently, if, after the condensation of the nitric acid, it is desired to obtain the nitrogen in a pure state. To the pipe system I to VI there are connected four to eight pipes A—H, of the same kind, the object of which is merely to evaporate the aqueous solution of nitric acid and subsequently to condense it again, as far as possible in a quantitative manner, the operations being carried out consecutively in accordance with the heat exchange principle. In pipe A, water vapor and vapor of nitric acid are generated from a mixture of sulfuric acid, water and nitric acid flowing as a secondary current, oxygen being also preferably present. The vaporized water and nitric acid are conducted to pipe I, where they pass through the stages already described. The aqueous sulfuric acid from A then passes into B, and there flowing as a primary current it comes into contact with condensed water and nitric acid derived from pipes V and VI and introduced in the primary direction and after passing through the tube is returned with them to A. For the purpose of removing the last traces of oxids of nitrogen, the nitrogen is conveyed from pipe B to pipe E, where it is heated by a secondary current of dilute sulfuric acid. Hence it is conveyed in the primary direction into pipe H, where it meets a small amount of steam, flowing in the same direction, this steam being that given off from pipe II, in the primary direction. The nitrogen is thus completely purified by water condensation. The liquid in H is renewed as slowly as possible from pipe A at 150° C. and after traversing H, returns to the opposite side of A, namely that at 120° C. From pipe III, the oxygen is conveyed into a slowly flowing primary current of dilute sulfuric acid in C, and from the latter it passes in the secondary direction through F, and thence in the primary direction through G, where it is completely purified in the same way as the nitrogen in pipes E and H. The air required for the process is introduced in the secondary direction into pipe D, in which a primary current of similar composition to that in B is slowly flowing.

Figs. 2–6 indicate the device employed for carrying into practical effect the principle of exchange of heat.

In the present process the idea of the invention is to bring about the heat exchange by means of a separate intermediary, namely by means of a quantity of small solid bodies, preferably small balls of equal size which fill the body of the current and oppose the movement of the same, that is to say, in their entirety they represent, with reference to the current of liquid, a counter current which completely penetrates through the former and thus enable an almost complete heat exchange to be insured. The application of the process necessitates different methods according to circumstances. For example it can be restricted to one in which use is made of an intermediate body for effecting exchange of heat between the actual liquid or gaseous current and the heat conducting partition, and in that case it would be sufficient to fill the space through which the currents flow with grains of metal, and to impart also to the grains a gyratory motion about the axis of the current by giving them space for moving and rotating the system of tubes about its longitudinal axis.

Fig. 2 indicates diagrammatically one form of device suitable for carrying into practical effect an exchange of heat between two liquid currents flowing at constant speed.

Two hollow cylinders (1) $a, b, c, d$ (axis $q, n$) and (2) $g, h, i, k$ (axis $o, p$) are filled with identical grains of similar material, for example quarts; the grains lie on perforated bottoms placed close to $a, b$, or $k, i$, and fill the cylinders right up to $d, c$, or $g, h$. The liquids which are to be heated or cooled as the case may be, are directed through the cylinders (1) and (2) alternatively in the manner hereinafter described. Considering the cylinder (1) the temperature conditions prevailing therein at the first stage of the series of operations when the liquid is allowed to enter the cylinder at $q$ are as follows:—At $a, b$ the temperature is T and proceeding along the cylinder it falls uniformly to $T_0$ at $e, f$ and beyond $e, f$ up to $d, c$ the temperature is $T_0$. At the stage when the cylinder (1) is in the condition just discussed, the cylinder (2) has a temperature T between $k, i$ and $l, m$, which temperature gradually falls to $T_0$ between $l, m$ and $g, h$.

The working of the apparatus is as follows:—The hot liquid which it is desired to cool enters the cylinder (1) through $q$ and flowing therethrough escapes at the opposite end $n$, the flow being continued until the cylinder becomes heated to such an extent that the region at the temperature T extends to $a', b'$, from which point the temperature uniformly falls to $T_0$ at $d, c$. While the hot liquid is flowing through the cylinder (1) the cool liquid which it is desired to heat is allowed to flow through cylinder (2) whereby the region at the temperature $T_0$ is gradually extended until it reaches $g', h'$, whence the temperature uniformly increases to T at $k, i$. When this state has been reached, i. e. when the transition region or region of intermediate temperatures between T and $T_0$ has moved from $a, b, f, e$ in the cylinder (1) to $a', b', c, d$ in the same cylinder, and the transition region has moved from $g, h, m, l$ in cylinder (2) to $g', h', i, k$ in the same cylinder then by means of an electric recording thermometer a device is set in motion which automatically changes the direction of the hot liquid from cylinder (1) to cylinder (2) into the latter of which it flows in the direction $p, o$, and the direction of the cold liquid from cylinder (2) to cylinder (1) in which it flows in the direction $n, q$. When the temperature conditions in the two cylinders have attained their original state, namely, a temperature $T_0$ prevailing in cylinder (1) from $e, f$ to $d, c$ and a temperature T prevailing in cylinder (2) from $l, m$ to $k, i$ the hot and cold currents of liquid are again automatically changed in direction so as to flow through the cylinders (1) and (2) respectively. The cycle of flow of the currents of liquids can be repeated any number of times.

The grains transmitting the heat may be given a movement of their own in opposition to the current, so that each temperature point retains its fixed place in the apparatus. This construction is more particularly suitable for liquids which on change of temperature either evolve or absorb gases or vapors, especially when such volatile ingredients are to take part in parallel or counter current in the heat exchange.

In order to move the grains against the current, there could be employed for instance a device such as that shown in Fig. 3, which represents a section of one of the heat exchange tubes through its longitudinal axis.

In the interior of the tube and normally to its walls is fixed a longitudinal partition $r_1 \, r_2 \, r_3 \, r_4 \, r_5 \, r_6 \, r_7 \, r_8$ of helical form and perforated like a sieve, so that it easily allows the liquid to pass but keeps back the grains. If the liquid is guided from right to left, the grains move, in accordance with the helical movement, in the opposite direction when the pipe is rotated about its longitudinal axis (together with a corresponding second branch of the current), in such a manner that $r_6$ passes behind the plane of the drawing.

The grains and liquid preferably fill at the outside one quarter of the tube, while the whole of the remaining space is filled with grains and gases or vapors. This insures not only a better and longer contact of the liquid with the surface of the grains, but also a satisfactory mixing of the former with the gases and vapors.

The grains at the end of the tube, as shown in Fig. 4, pass (as the device rotates in the direction of the arrow) through a spiral tube from $s$ over $s_1$ and $s_2$ into a siphon with a hydraulic seal, while the liquid carried away is continuously returned through a sieve at $s_1$ through the pipe $s_1 \, s_3$ to the starting point, so that when the sieve reaches the position shown in the drawing, namely the level of the current of liquid in the tube, only the part of the tube from $s'$ to $s_2$ remains filled with grains and liquid. The latter pipe equalizes the air pressure. From the siphon the grains pass into the corresponding second branch of current for which purpose there could be employed a device, for example like that shown in Fig. 5. In the position illustrated in the latter figure the grains sink at $t$, into the discharge pipe $t, t_1, t_2$ (preferably slightly widened at this point) through which they pass, owing to the rotation of the apparatus about $u$, in the direction of the arrow to their point of destination $t_2$. The pipe $t_1 \, u$ with a sieve at $t_1$ returns the liquid carried away, and the air pressure is equalized through the pipe $t_3 \, t_4$. The pumping over of the liquids takes place in an analogous manner for instance by means of rotating simple spiral tubes.

The dimensions of the discharge and supply pipes are further regulated empirically by introducing a brake-body into the path of the current; this regulation is preferably automatically brought about by means of a thermometer placed at the upper or lower temperature limit, any rising or falling of which above or below the normal temperature at the point at which it is placed closing an electric contact which releases the mechanism for raising or lowering the slide. The path of the slide is held free from any obstruction by grains by obliquely cutting the surface behind the closing edge of the brake-surface, so that it slightly deviates toward the direction of movement of the grains. The movement of the slide can be effected in any desired manner by rotating a rod which is preferably guided through a narrow tube parallel to the main axis out of reach of heat and acid. The end of the tube is closed in an air-tight manner by an annular collar of the rotating rod, the surfaces being smeared with vaseline and grinding with a moderate pressure.

If in order to economize space it is desired to connect rotating steam pipes containing corrosive steam or vapors at high temperatures to stationary pipes, this could be done in accordance with the diagram shown in Fig. 6, which is a longitudinal section through a system of concentric glass tubes arranged within each other and sliding or grinding with a slight pressure in one another, the flat cut surfaces being marked $v_1, v_2$ and $v_3, v_4$. The lines behind the plane of the drawing are marked in dotted lines. The body on the right hand side rotates in such a manner that the low position comes in front of the plane of the drawing. A tight joint of the ground faces is effected by moistening with sulfuric acid, which, being supplied through the pipes $w$ and $w_1$ slightly covers the bottom of the tubes. Any liquid trickling through the ground joints is drawn off through $x$ together with traces of steam, and any liquid penetrating into the conveying pipes $y\ y_1$ during their low position is always pumped back by their helical branch. The helical dam $z$ prevents an advance of the liquid, which therefore always must trickle out at $v_2$. If desired the ground joints could be placed behind each other on a single tapering glass tube provided with lateral gas holes.

The materials of which the apparatus is constructed are as follows:—The main pipes are made of earthenware containing the largest possible proportion of silicic acid, sharply bent and provided with an acid glaze, for example, that produced by melting pyro-phosphates. The pipes can for example be made in two lengths connected by pipes of some less refractory material. The closing cover with the connection branches can be either melted on or pressed with the aid of a slightly glazed surface on a packing of fine platinum wire. The material of the pipes for carrying sulfuric acid consists of about 80% lead, and for very high concentration of acids, of cast-iron, such iron preferably containing chromium and silicon, and being provided with a glaze of poly-silicates and basic phosphates and antimonates of tin which are not affected by boiling acids.

In order to prevent conduction of heat in the axial direction the system of tubes is longitudinally divided into sections, between which is pressed a short length of pottery provided with a glaze of similar composition. As a packing a thin lead ring is used, and for the iron parts a thin wire ring of gold alloy.

As material for the connection pipes Jena-glass is employed. For the material of the grains quartz can be employed but in certain cases these would have to be replaced by enameled metal balls or composition balls inclosing finely divided reduced metal.

The whole system of pipes is mounted on one and the same spindle and properly packed with asbestos, so that the whole apparatus finally gives the impression of a simple roller about four meters long and two meters in diameter, unless it is preferred to work with smaller dimensions and a consequently smaller output. The colder pipes are mounted outside. For making up the heat lost, the siphon at 280° can be maintained at the desired temperature, either by electric heating or surface combustion.

What I claim as my invention and desire to secure by Letters Patent is:—

1. The herein described process for obtaining oxygen from the air by a continuous cycle of operations, which consists in producing a high oxid of nitrogen by the action of air on a lower oxid, decomposing the higher oxid into oxygen and the lower oxid separating the oxygen from the other products of decomposition of the said higher oxid and thereafter repeating the process any number of times.

2. The herein described process for obtaining oxygen from the air by a continuous cycle of operations, which consists in producing a high oxid of nitrogen by the action of air on a lower oxid, reacting the said high oxid with sulfuric acid to form nitrosulfonic acid, oxygen and water separating and collecting the oxygen liberated, decomposing the nitrosulfonic acid into sulfuric acid and the lower oxid of nitrogen, and thereafter repeating the process any number of times.

3. The herein described process for obtaining oxygen from the air by a continuous cycle of operations, which consists in producing a high oxid of nitrogen by the action of air on a lower oxid, reacting the said higher oxid with hot concentrated sulfuric acid to form nitrosulfonic acid, oxygen and water separating and collecting the oxygen liberated, decomposing the nitrosulfonic acid into sulfuric acid and the lower oxid of nitrogen and thereafter repeating the process any number of times.

4. The herein described process for obtaining oxygen from the air by a continuous cycle of operations which consists in producing a high oxid of nitrogen by the action of air on a lower oxid, reacting the said higher oxid with hot concentrated sulfuric acid to form nitro-sulfonic acid, oxygen and water separating and collecting the oxygen liberated, decomposing the nitro-sulfonic acid by cooling and the action of water, and thereafter repeating the process any number of times.

5. The herein described process for obtaining oxygen from the air by a continuous cycle of operations, which consists in producing a high oxid of nitrogen by the action of air on a lower oxid, reacting the said higher oxid with hot concentrated sulfuric acid to form nitro-sulfonic acid, oxygen and water separating and collecting the oxygen liberated, decomposing the nitro-sulfonic acid into sulfuric acid and the lower oxid of nitrogen, and carrying out the reactions in such manner that an interchange of heat can be effected between relatively hot fluids to be cooled, and cool fluids to be heated, by utilizing the heat of a hot fluid for heating a cooler fluid.

6. The herein described process for obtaining oxygen from the air by a continuous cycle of operations, which consists in producing a high oxid of nitrogen by the action of air on a lower oxid, re-acting the said higher oxid with hot concentrated sulfuric acid to form nitro-sulfonic acid, oxygen and water, separating and collecting the oxygen liberated, decomposing the nitro-sulfonic acid into sulfuric acid and the lower oxid of nitrogen, and carrying out the reactions in such manner that an interchange of heat can be effected between relatively hot fluids to be cooled, and cooled fluids to be heated by utilizing the heat of hot concentrated sulfuric acid for heating cooler nitric acid and water vapor.

7. The herein described process for obtaining oxygen from the air by a continuous cycle of operations, which consists in producing a high oxid of nitrogen by the action of air on a lower oxid reacting the said higher oxid with hot concentrated sulfuric acid to form nitro-sulfonic acid, oxygen and water separating and collecting the oxygen liberated, decomposing the nitro-sulfonic acid into sulfuric acid and a lower oxid of nitrogen and providing an intermediate liquid for effecting an interchange of heat, between a relatively hot fluid, which has to be cooled and a cool fluid which has to be heated, when the fluid which has to be cooled and the fluid which has to be heated must not come into direct contact with one another.

8. The herein described process for obtaining oxygen from the air by a continuous cycle of operations which consists in producing a high oxid of nitrogen by the action of air on a lower oxid reacting the said higher oxid with hot concentrated sulfuric acid to form nitro-sulfonic acid, oxygen and water separating and collecting the oxygen liberated, decomposing the nitro-sulfonic acid into sulfuric acid and a lower oxid of nitrogen and providing an intermediate substance for effecting an interchange of heat between relatively hot fluids which have to be cooled and cool fluids which have to be heated.

9. The herein described process for obtaining oxygen from the air by a continuous cycle of operations which consists in producing a high oxid of nitrogen by the action of air on a lower oxid, reacting the said higher oxid with hot concentrated sulfuric acid to form nitro-sulfonic acid, oxygen and water separating and collecting the oxygen liberated, decomposing the nitro-sulfonic acid into sulfuric acid and a lower oxid of nitrogen and providing small solid particles to act as intermediate substances for effecting an interchange of heat between relatively hot fluids which have to be cooled and cool fluids which have to be heated.

10. The herein described process for obtaining oxygen from the air by a continuous cycle of operations which consists in producing a high oxid of nitrogen by the action of air on a lower oxid, reacting the said higher oxid with hot concentrated sulfuric acid to form nitro-sulfonic acid, oxygen and water, decomposing the nitro-sulfonic acid, into sulfuric acid and a lower oxid of nitrogen and providing small particles of quartz to act as intermediate substances for effecting an interchange of heat between relatively hot fluids which have to be cooled and cool fluids which have to be heated.

11. The herein described process for obtaining oxygen from the air by a continuous cycle of operations which consists in reacting the vapors of nitric acid with sulfuric acid to produce nitrosyl sulfuric acid water and oxygen, decomposing the nitrosyl sulfuric acid by the action of water into sulfuric acid and nitrous anhydrid ($N_2O_3$) and combining the said nitrous anhydrid with oxygen and water so as to re-form nitric acid, and thereafter repeating the complete cycle of operations any number of times.

In testimony whereof I have signed my name to this specification in the presence of two subscribing witnesses.

LUDWIG BERGFELD.

Witnesses:
 ARTHUR J. BUNDY,
 OTTILIE SIETZ.